United States Patent
Tsuchiya et al.

(10) Patent No.: US 11,106,371 B1
(45) Date of Patent: Aug. 31, 2021

(54) I/O PATH RESERVATION WITH OUT OF BAND MANAGEMENT

(71) Applicant: Hitachi, Ltd., Tokyo (JP)

(72) Inventors: Akiyoshi Tsuchiya, San Jose, CA (US); Tomohiro Kawaguchi, Santa Clara, CA (US)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 16/900,449

(22) Filed: Jun. 12, 2020

(51) Int. Cl.
*G06F 3/06* (2006.01)

(52) U.S. Cl.
CPC .......... *G06F 3/0635* (2013.01); *G06F 3/065* (2013.01); *G06F 3/0613* (2013.01); *G06F 3/0619* (2013.01); *G06F 3/0659* (2013.01); *G06F 3/0683* (2013.01)

(58) Field of Classification Search
CPC .... G06F 3/0635; G06F 3/0613; G06F 3/0619; G06F 3/065; G06F 3/0659; G06F 3/0683
See application file for complete search history.

(56) References Cited

U.S. PATENT DOCUMENTS

| | | |
|---|---|---|
| 8,645,649 B2 | 2/2014 | Kaiya et al. |
| 10,114,691 B2 | 10/2018 | Johri et al. |
| 2013/0086349 A1* | 4/2013 | Kaiya ............... G06F 3/0637 711/164 |
| 2016/0364287 A1* | 12/2016 | Johri ............... G06F 3/0683 |
| 2018/0268011 A1* | 9/2018 | Cao ............... G06F 16/2343 |
| 2020/0142789 A1* | 5/2020 | Ali ............... H04L 41/0668 |

* cited by examiner

*Primary Examiner* — Eric Cardwell
(74) *Attorney, Agent, or Firm* — Procopio, Cory, Hargreaves & Savitch LLP.

(57) ABSTRACT

Example implementations described herein are directed to Input/Output (I/O) path reservation with out of band management. In example implementations, for failure of a storage orchestrator to delete the path between the container and the first volume, the example implementations described herein are directed to deleting a path between the first volume and a quorum volume; and establishing an I/O path between the new container and the second volume.

15 Claims, 12 Drawing Sheets

| Path ID | Initiator ID | Volume ID |
|---------|--------------|-----------|
| a | A | 1 |

FIG. 5

| Initiator ID | Server ID |
|---|---|
| A | 1 |
| B | 2 |
| C | 3 |
| D | 4 |

FIG. 6

| Volume ID | Size | Role | Owner | Pair volume ID | Pair status |
|---|---|---|---|---|---|
| 1 | 100GB | Primary | 1 | 2 | Pair |
| 2 | 100GB | Secondary | 2 | 1 | Pair |
| 3 | 200GB | Primary | 1 | 4 | suspend |
| 4 | 200GB | Secondary | 2 | 3 | suspend |

FIG. 7

| Path ID | Initiator ID | Volume ID |
|---|---|---|
| c | E | 1 |
| d | F | 1 |

FIG. 8

| Initiator ID | Storage device ID |
|---|---|
| E | 1 |
| F | 2 |

FIG. 9

| Device ID | Address |
|---|---|
| 1 | 192.168.1.100 |
| 2 | 192.168.2.100 |
| quorum | 192.168.3.100 |

FIG. 10

I/O PATH RESERVATION WITH OUT OF BAND MANAGEMENT

BACKGROUND

Field

The present disclosure is generally related to container platforms, and more specifically, to facilitating Input/Output (I/O) path reservations with out of band management

Related Art

Containers have become utilized to facilitate an agile and flexible application platform. Container orchestration systems are used to deploy and manage the containerized application on the clustered plurality of servers.

Recently, containers have been utilized for mission critical or business critical applications. At first, container had mainly been used for stateless application which do not store data to data storage. Recently, container adoption has been utilized for stateful applications which store data to data storage. In addition, container adoption is expanding to critical applications which require 24/7 service or no data loss.

To support critical applications, a container platform has to support high availability (HA) configurations. Application data is replicated among storages systems to avoid stop of service and data loss. When containers fail because of system failure such as a server or storage failure, container orchestrator restarts the container with the available server and data. This mechanism improves availability of the service which is served by the container.

In this system, split brain must be avoided to prevent data inconsistency or data corruption. If a container is doubly launched and the duplicate containers write data to volume, data may be corrupted because each container independently updates metadata without consideration of the other written data from the other container.

To prevent split brain, related art implementations use small computer system interface (SCSI) reservation commands. For example, SCSI reservation synchronization can involve implementations such that when the storage device receives a write command, the storage device writes data to its own drive and transmit the command to pair storage device to synchronize data. When the storage device receives the SCSI reservation command, the storage device also transmits the command to the paired storage device. By this mechanism, I/O path is reserved by requestor of reservation and I/O request from the other server become error.

Related art implementations also involve a lock of ownership of the volume with Quorum. If the connectivity between storage device is lost, storage devices may become unable to forward the SCSI reservation command and the write command. Thus, related art implementations involve use of the Quorum. When communication fails between storage devices, each storage device tries to lock ownership of the volume. If the lock succeeds, the storage device can continue I/O. If lock fails because the paired storage device has succeeded with the lock, the storage device returns an error to a write request.

SUMMARY

In order to limit the number of servers which can write the volume to one server, the related art utilizes an in-band method called SCSI reservation. However, in some systems such as container system, storage management software uses an out-of-band method to control storage devices. Therefore, related art implementations cannot be applied for such systems.

Aspects of the present disclosure can involve a method, involving deleting a path (e.g., I/O path) between a container and a first volume when launching a new container accessing a second volume; and for failure of a storage orchestrator to delete the path between the container and the first volume, deleting a path between the first volume and a quorum volume; and establishing an I/O path between the new container and the second volume.

Aspects of the present disclosure can involve a non-transitory computer readable medium, storing instructions for executing a process, the instructions involving deleting a path (e.g., I/O path) between a container and a first volume when launching a new container accessing a second volume; and for failure of a storage orchestrator to delete the path between the container and the first volume, deleting a path between the first volume and a quorum volume; and establishing an I/O path between the new container and the second volume.

Aspects of the present disclosure can involve a system involving means for deleting a path (e.g., I/O path) between a container and a first volume when launching a new container accessing a second volume; and for failure of a storage orchestrator to delete the path between the container and the first volume, means for deleting a path between the first storage device managing the first volume and a quorum volume; and means for establishing an I/O path between the new container and the second volume on the second storage device.

Aspects of the present disclosure can involve a storage device in a system including a plurality of storage devices, the storage device involving a processor, configured to delete a path (e.g., I/O path) between a container and a first volume when launching a new container accessing a second volume; and for failure of a storage orchestrator to delete the path between the container and the first volume, delete a path between the first storage device managing the first volume and a quorum volume; and establish an I/O path between the new container and the second volume on the second storage device.

BRIEF DESCRIPTION OF DRAWINGS

FIG. 5 illustrates an example path table, in accordance with an example implementation.

FIG. 6 illustrates an example of initiator table, in accordance with an example implementation.

FIG. 7 illustrates an example of volume table, in accordance with an example implementation.

FIG. 8 illustrates an example of quorum path table, in accordance with an example implementation.

FIG. 9 illustrates an example of quorum initiator table, in accordance with an example implementation.

FIG. 10 illustrates an example of device table, in accordance with an example implementation.

DETAILED DESCRIPTION

Figure 1:
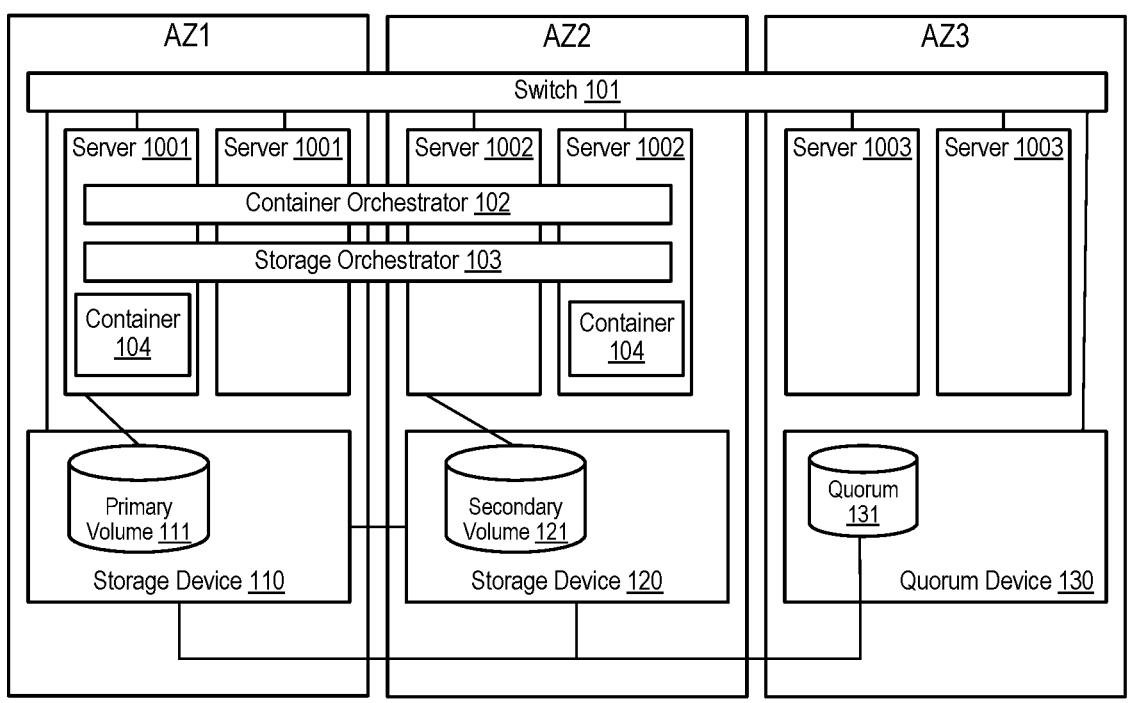
FIG. 1 illustrates an example of a system configuration in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example of ae system configuration in accordance with an example implementation. In the system of FIG. 1, each availability zone (AZ) can involve one or more servers 1001, 1002, 1003 and storage devices 110, 120, 130. Availability zones are physically and logically isolated locations within a system, wherein the isolation is managed by switch 101. The one or more servers 1001, 1002 are managed by container orchestrator 102 which schedules container execution. When users request the container orchestrator 102 to run a container 104, container orchestrator decides the location of the container 104 and launches the container 104. When the container 104 requires a data volume, container orchestrator 102 requests the storage orchestrator 103 to prepare a data volume (e.g., create and mount new volume or mount an existing volume). The data volume is replicated between storage devices 110, 120 across different AZs. One volume is called primary volume 111 and the other volume is called secondary volume 121. Throughout the present disclosure, a pair of primary and secondary volumes is referred to as "pair". Further, a quorum volume 131 is used. The quorum volume 131 is located in a storage device 130 that belongs to a different AZ from storage devices managing the primary 111 and secondary volumes 121. Container and Storage orchestrator 102, 103 can run on one of the servers 1003 of the AZ designated for the quorum, depending on the desired implementation. These orchestrators can also run on all the servers to facilitate a distributed process involving the container 104 and storage management.

If connectivity of the servers facilitating the container 104 is lost by the network failure, the container orchestrator 102 restarts the containers on a different server. However, in this case, the containers 104 are still running on disconnected servers. Therefore, the same containers can be duplicated within the system. In this case, multiple containers will write to the pair, which can cause corruption of data. Example implementations are therefore directed to preventing multiple writes to the pair for data protection.

Figure 2:
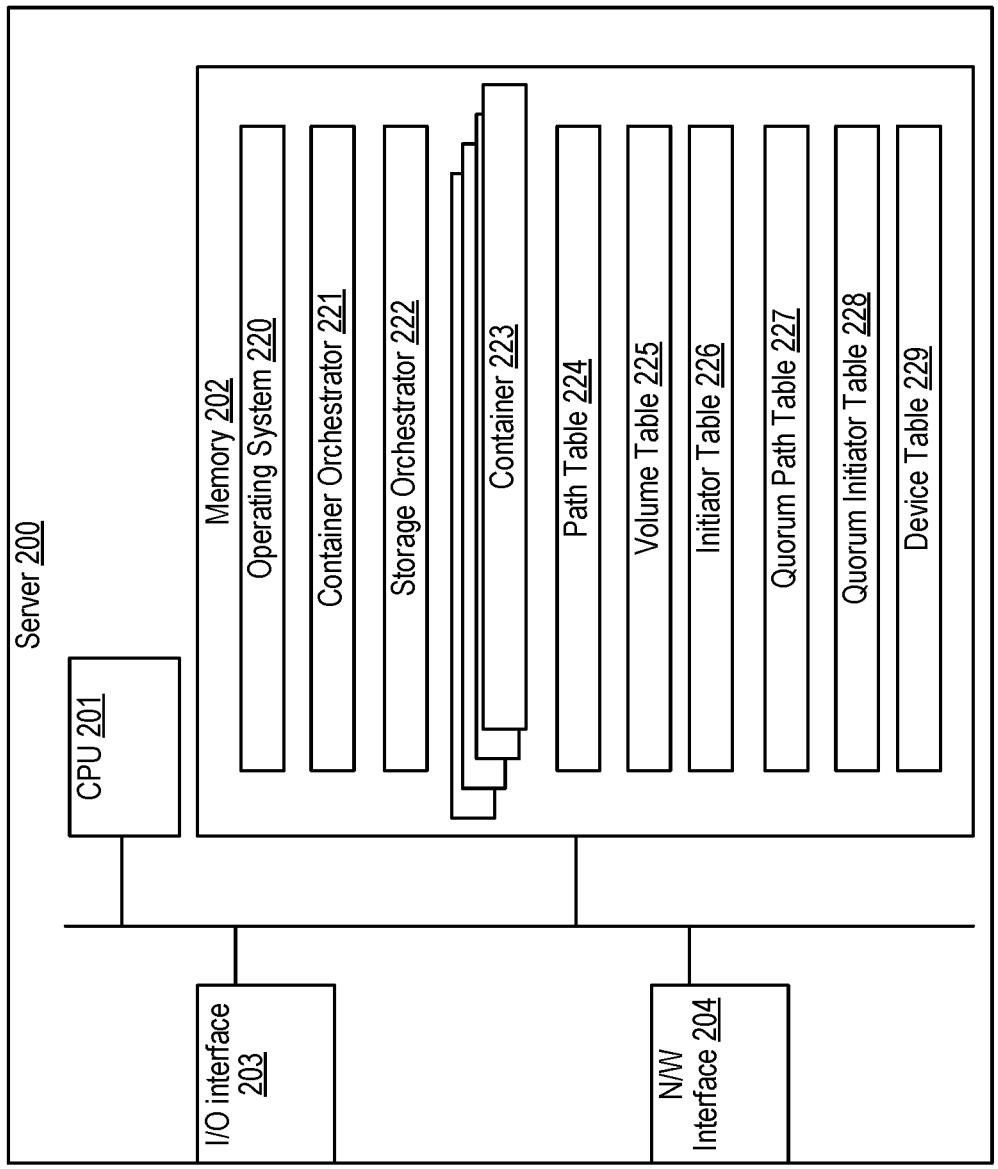
FIG. 2 illustrates an example hardware configuration of servers, in accordance with an example implementation.

FIG. 2 illustrates an example hardware configuration of servers 200, in accordance with an example implementation. To reduce memory consumption, data in tables can be stored in non-volatile media, wherein portions or subsets of the tables are cached in memory 202 depending on the desired implementation. Server 200 can include a central processing unit (CPU) 201 which can be in the form of one or more physical processor or a combination of hardware and software processors. Server 200 can also include memory 202, I/O interface 203, and Network (N/W) interface 204. Examples of I/O interface 203 are network interface card (NIC) and host bus adapter (HBA). Example of N/W interface 204 is NIC. As I/O interface 203, and N/W interface 204, wireless network can be applicable such as Wi-Fi (IEEE 802.11) and 5G.

Memory 202 can be configured to manage Operating System 220, Container Orchestrator 221, Storage Orchestrator 222 and Container 223, which can be loaded into CPU 201 for execution. Memory 202 can also manage one or more tables to facilitate management information for the various functions, such as path table 224, volume table 225, initiator table 226, quorum path table 227, quorum initiator table 228, and device table 229.

Figure 11:
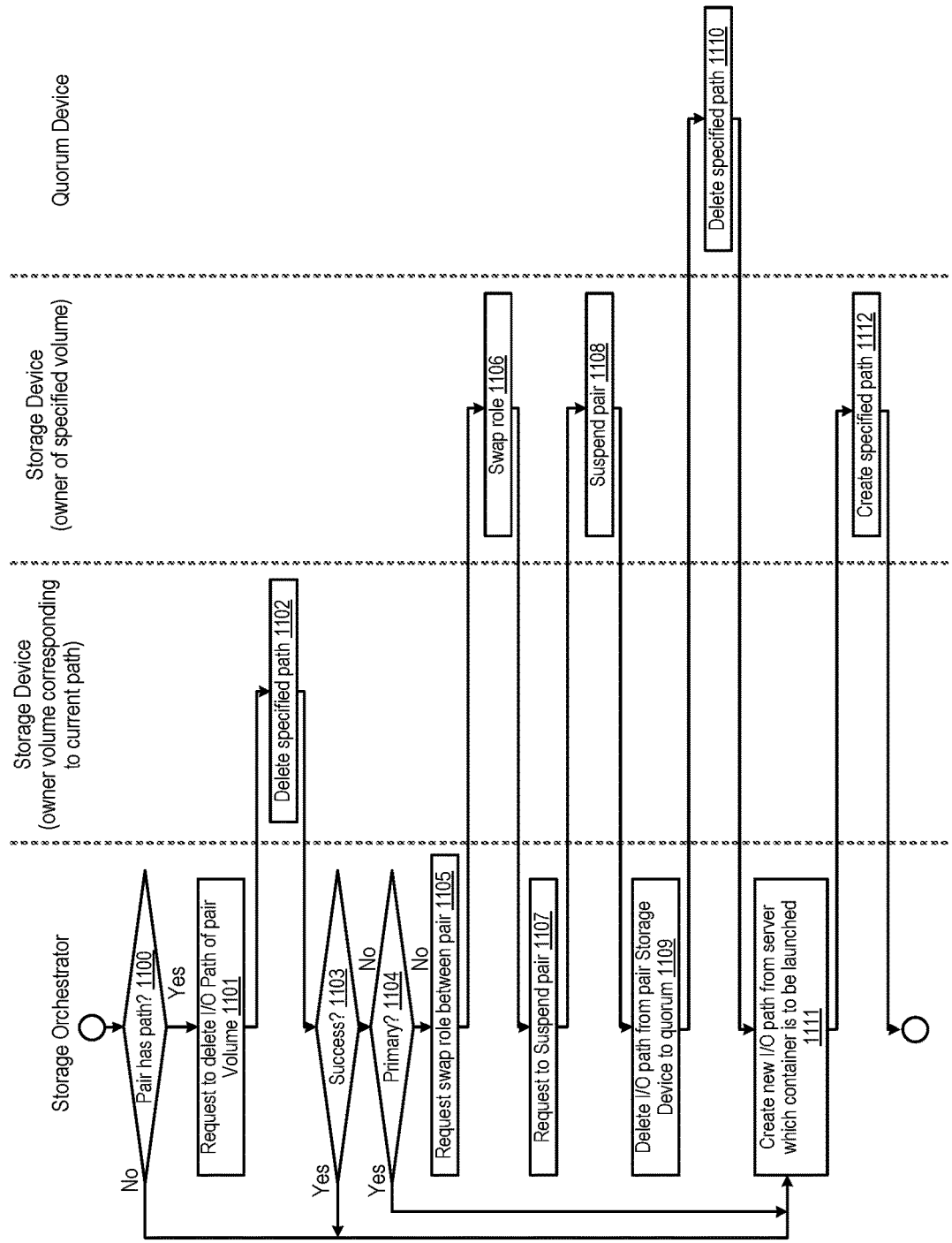
FIG. 11 illustrates the processing flow of I/O path reservation with out of band management I/F, in accordance with an example implementation.
Figure 12:
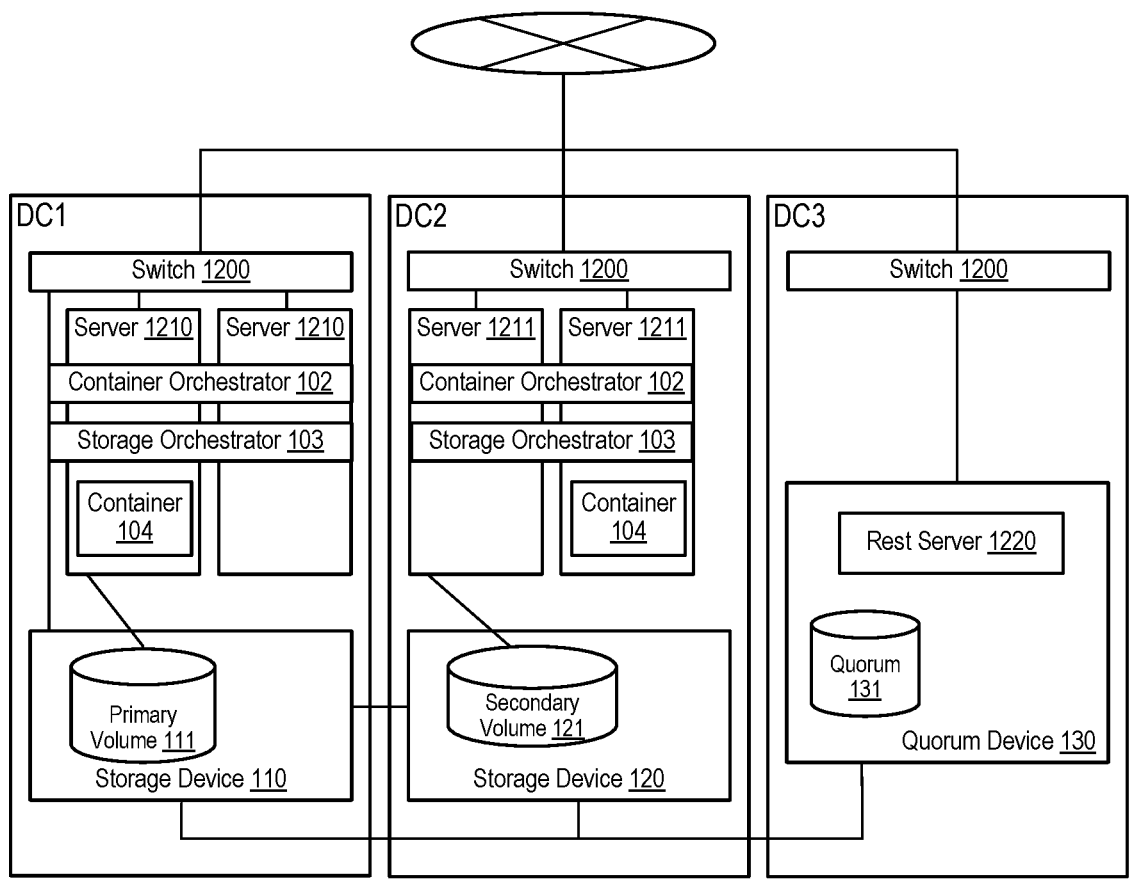
FIG. 12 illustrates another example system, in accordance with an example implementation.

As illustrated in FIG. 1 and FIG. 12, each storage device can involve one or more servers managing a storage device. In such configurations, each of the one or more servers can execute storage orchestrator 222 and container orchestrator 221 with CPU 201, wherein CPU 201 is configured to delete a path between a container and a first volume; and launch a new container accessing to a second volume through any desired implementation for launching a new container as utilized by storage orchestrator 222 and container orchestrator 221. For failure of a storage orchestrator to delete the path between the container and the first volume, CPU 201 is configured to delete a path between the first storage device managing the first volume and a quorum volume; and establish an Input/Output (I/O) path between the new container and the second volume as illustrated at 1109-1112 of FIG. 11.

As illustrated in FIG. 1 and FIG. 12, the first volume and second volume are paired volumes, and CPU 201 can be configured to delete another path between the first volume and the second volume as illustrated at 1101 to 1103 of FIG. 11.

CPU 201 is configured to, for the first volume being designated as a primary volume, swap the primary volume to the second volume as illustrated at 1104 to 1106 of FIG. 11. CPU 201 is also configured to suspend pair copy operations between the first volume and the second volume as illustrated at 1107 to 1108 of FIG. 11.

As illustrated in FIG. 1 and FIG. 12, the storage orchestrator can be provided across a plurality of storage devices, wherein a first storage device of the plurality of storage devices manages the first volume, and a second storage device from the plurality of storage devices manages the second volume. As illustrated in FIG. 12, each storage device of the plurality of storage devices can have its own instantiation of the storage orchestrator.

Figure 3:
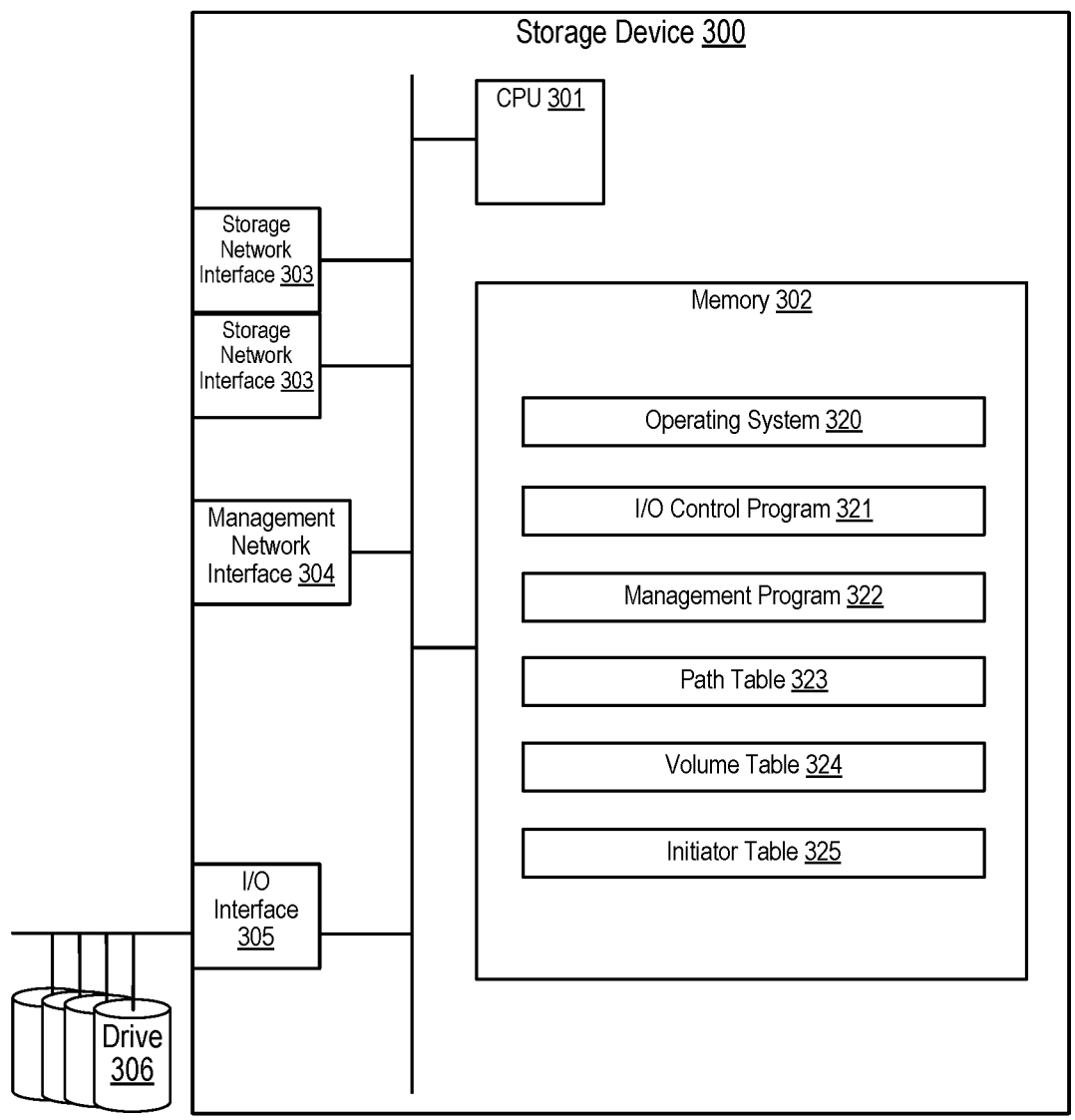
FIG. 3 illustrates an example of hardware configuration of storage devices, in accordance with an example implementation.

FIG. 3 illustrates an example of hardware configuration of storage devices 300, in accordance with an example implementation. To reduce memory consumption, data in tables can be stored in non-volatile media, wherein portions or subsets of the tables are cached in memory 302 depending on the desired implementation. Through the use of management program 322, storage device 300 receive requests regarding getting or setting configuration. This management program 322 generally support RESTful Application Programming Interface (API).

Storage device 300 can include a central processing unit (CPU) 301 which can be in the form of one or more physical processors or a combination of hardware and software processors. Storage device 300 can also include memory 302, one or more storage network interfaces 303, management network interface 304, and I/O interface 305. Storage device 300 can facilitate storage through the use of one or more drives 306, such as flash drives, hard disk drives, and so on. I/O control program 321 communicates with servers through storage network interfaces 403. The management program 322 receives request from servers 200 through management network interface 304. Examples of storage network interfaces 303 are NIC and HBA. Example of management network interface 304 is NIC. As each interface, wireless network can be applicable such as Wi-Fi (IEEE 802.11) and 5G.

Memory 302 can be configured to manage Operating System 320, I/O Control Program 321, and Management Program 322, which can be loaded into CPU 301 for execution. Memory 302 can also manage one or more tables to facilitate management information for the various functions, such as path table 323, volume table 324, and initiator table 325.

Figure 4:
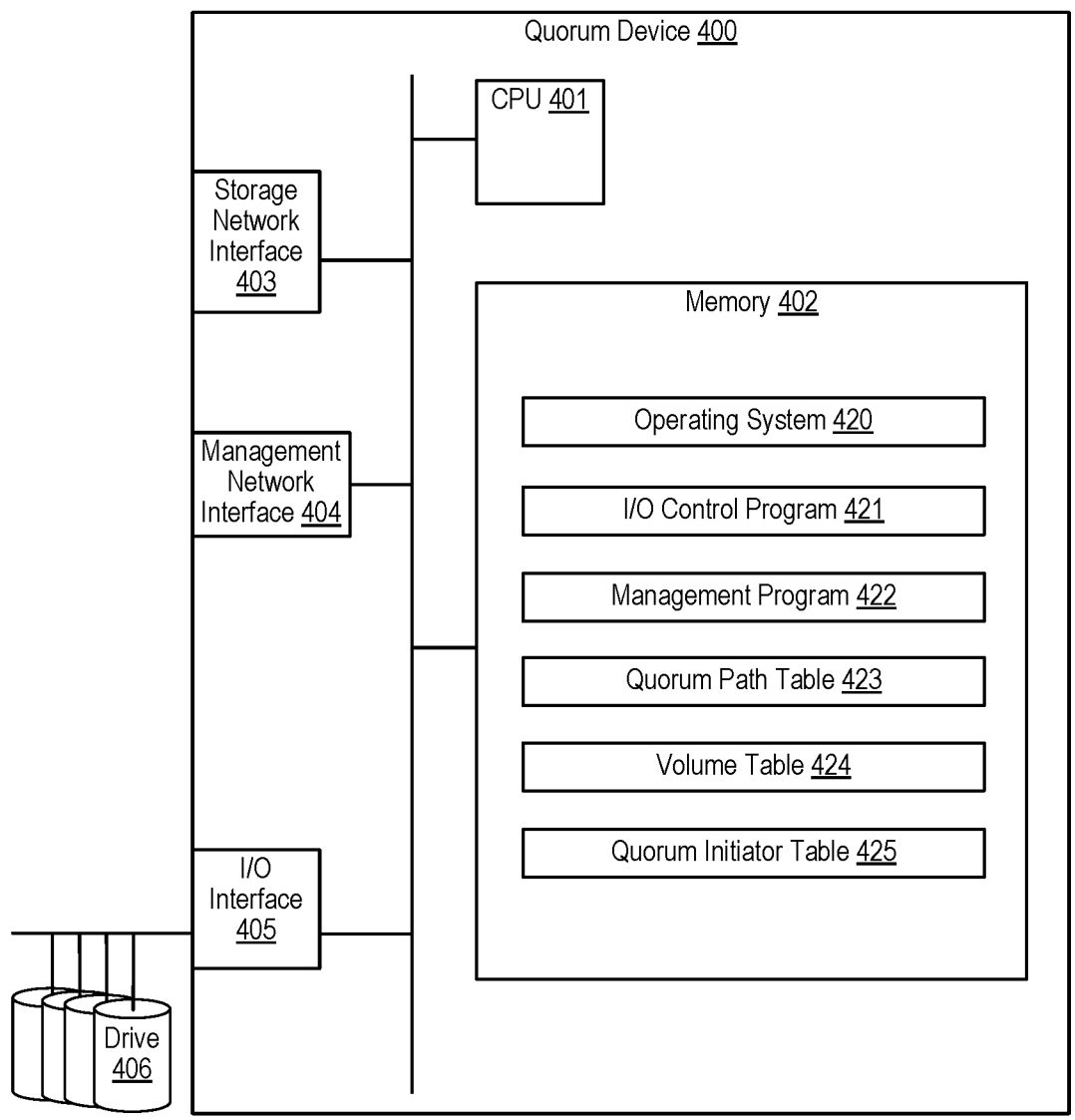
FIG. 4 illustrates an example of hardware configuration of quorum device, in accordance with an example implementation.

FIG. 4 illustrates an example of hardware configuration of quorum device, in accordance with an example implementation. To reduce memory consumption, data in tables can be stored in non-volatile media, wherein portions or subsets of the tables are cached in memory 402 depending on the desired implementation. Through management program 422, the storage device facilitating the quorum device 400 receive requests involving getting or setting configuration. This management program 422 generally supports RESTful API.

In another example implementation, quorum device 400 can be in the form of a general purpose server to facilitate the functionality of quorum service, and can involve have iSCSI target functionality and management program.

Quorum device 400 can include a central processing unit (CPU) 401 which can be in the form of one or more physical processors or a combination of hardware and software processors. Quorum device 400 can also include memory 402, one or more storage network interfaces 403, management network interface 404, and I/O interface 405. Quorum device 400 can facilitate storage through the use of one or more drives 406, such as flash drives, hard disk drives, and so on. I/O control program 421 communicates with storage devices for quorum access 300 through storage network interfaces 403. The management program 422 receives request from servers 200 through management network interface 404. Examples of storage network interfaces 403 are NIC and HBA. Example of management network interface 404 is NIC. As each interface, wireless network can be applicable such as Wi-Fi (IEEE 802.11) and 5G.

Memory 402 can be configured to manage Operating System 420, I/O Control Program 421, and Management Program 422, which can be loaded into CPU 401 for execution. Memory 402 can also manage one or more tables to facilitate management information for the various functions, such as Quorum path table 423, volume table 424, and initiator table 425.

Figure 5:
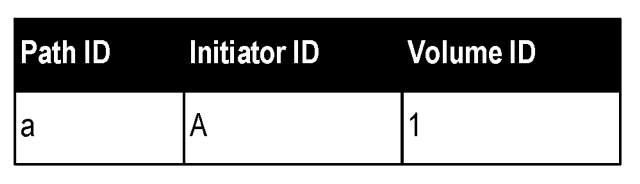

FIG. 5 illustrates an example path table, in accordance with an example implementation. The path table indicates which initiators can access the volume. The path table can include the path ID, the initiator ID, and the volume ID. An initiator ID is an identifier of SCSI initiator such as IP address, WWN (World Wide Name) and IQN (iSCSI Qualified Name).

Figure 6:
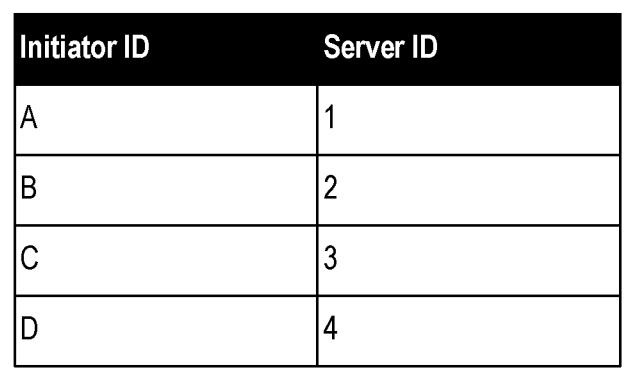

FIG. 6 illustrates an example of initiator table, in accordance with an example implementation. An initiator table indicates the relationship between servers 200 or I/O interface 203 and the volume. Storage devices can accept access requests from the servers 200 or or I/O interface 203 that is registered in the path table. For example, each entry of the initiator table has an initiator ID and server ID. An initiator ID is an identifier of SCSI initiator such as WWN and IQN. A server ID is an identifier of server of owner of the initiator.

FIG. 7 illustrates an example of volume table, in accordance with an example implementation. A volume table maintains information of each volumes. For example, each entry of the volume table has a volume ID, size, role, owner storage device, a pair volume ID, and pair status. Volume ID is an identifier of each of the volumes. Size is a capacity of the volume. A role is information indicating whether the volume is primary or secondary. Pair status indicates the status of data synchronization between a primary volume and a second volume. If the pair status is pair, replication between paired volumes is active. If the pair status is suspend, replication is suspended and. In this case, if storage device receive the data synchronization request from owner storage device of a pair volume, the storage device reject the request. A pair volume ID is identifier of volume that is replication source or destination of the volume. By identifying the pair and treating the pair as one volume, a virtual volume ID can be assigned. Pair status indicates the replication status. Status "pair" means that replication between volumes is active and data is synchronized. Status "suspend" means that replication between volume is inactive. At this status, a storage device rejects replication from the paired storage device.

The three types of tables shown from FIG. 5 to FIG. 7 are maintained by storage devices and storage orchestrator running on servers. In FIGS. 5 to 7, all information relevant to all storage device is described. However, each of the storage devices can only maintain information relevant to its own configuration. Storage orchestrator obtains the information in these tables from storage devices and caches them. To reduce memory consumption, only a part of the tables are maintained in the servers, depending on the desired implementation. When the other information is needed, storage orchestrator acquires the information from the storage on demand.

Figure 8:
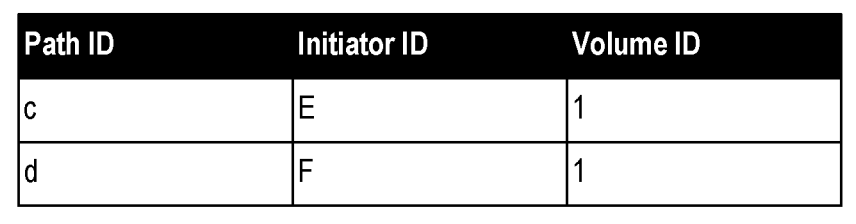

FIG. 8 illustrates an example of quorum path table, in accordance with an example implementation. A quorum path table indicates the relationship between the storage device and the quorum. Quorum device can accept access requests from the storage device that is registered in the quorum path table. For example, each entry of a quorum path table has a path ID, an initiator ID and a volume ID. Path ID is an identifier of each path. Initiator ID is an identifier of storage device. For example, when the quorum is offered as volume, the initiator is SCSI initiator such as host bus adaptor (HBA) and network interface card (NIC) for fiber channel or iSCSI initiator. IP address, MAC address, WWN, IQN and host name can also be used as examples of initiator ID, in accordance with the desired implementation. Volume ID is an identifier of the quorum volume. If quorum device has only one volume, then the volume ID can also be omitted. In addition, volume ID can be same value between two paths if owner storage devices of the initiators have a paired volume between storage devices. In the example of FIG. 8, both paths have the volume ID of '1' as the owner storage devices of the initiators have a paired volume between the storage devices.

Figure 9:
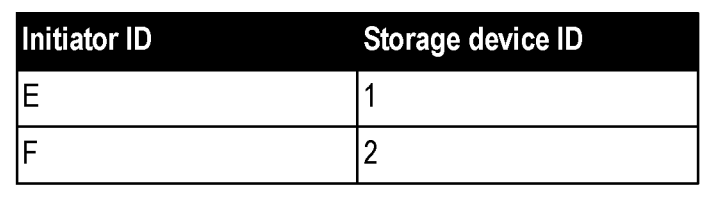

FIG. 9 illustrates an example of quorum initiator table, in accordance with an example implementation. The quorum initiator table maintains the list of initiators of the storage devices. For example, each entry of the quorum initiator table has an initiator ID and storage device ID. Initiator ID is an identifier of the initiator of the storage device. One of the storage network interfaces 303 can be used as an initiator for quorum access. Storage device ID is an identifier of the storage device owned by the initiator.

These two types of tables shown from FIG. 8 to FIG. 9 are maintained by the quorum device and storage orchestrator running on servers. To reduce memory consumption, only a part of the tables is maintained in servers depending on the desired implementation. When the other information is needed, storage orchestrator acquires the information from the storage on demand.

FIG. 10 illustrates an example of device table, in accordance with an example implementation. A device table maintains the information to access storage devices and a quorum device through management network interface 304 and 404. From this table, a storage orchestrator gets the request destination address when a storage orchestrator sends requests to storage devices or quorum device. Examples of address are IP address, host name and URL.

FIG. 11 illustrates the processing flow of I/O path reservation with out of band management I/F, in accordance with an example implementation. A storage orchestrator executes this processing flow to facilitate exclusive access to the volume pair when a container orchestrator requests a volume to a storage orchestrator. Container orchestrator requests volume when the container orchestrator launches a container and the container requires volume. For the request, container orchestrator specifies the volume ID of the volume which the container will use.

At 1100, the storage orchestrator checks whether the specified volume has the appropriate path with path table, volume table and initiator table. The appropriate path is the path from a server that the container is to be launched to a specified volume or its paired volume.

If so (Yes), the flow proceeds to 1101 wherein the storage orchestrator requests a storage device owning the volume corresponding to the specified path to delete the path. In response to the request, the storage device deletes the path at 1102.

In the case of network failure between the server the container is to be launched and the storage device owning the volume, split brain situation can be caused. In this case, this request will fail (e.g., request is timed out due to communication error). Thus at 1103, the storage orchestrator determines if the deletion of the path has succeeded. If the request fails (No), storage orchestrator executes processing to prevent container running on disconnected server from writing to the pair volume by proceeding to 1104.

To do so, storage orchestrator first determines if the specified volume is set to primary or not at 1104. If not (No), the storage orchestrator proceeds to 1105 and requests the owner storage device of specified volume to change the role to primary if the current role of specified volume is secondary. The owner storage device swaps the role of the specified volume to primary at 1106.

At 1107, the storage orchestrator requests the owner storage device of the specified volume to change pair status of the specified volume to "suspend". The owner storage device of the specified volume suspends the pair in response at 1108. By this status change, if the owner storage device of the pair volume receives write requests and transmits them to the owner storage device of the specified volume, the owner storage device of the specified volume will reject the write. After the change of the pair status, the owner storage of the pair volume receives error from the owner storage device of the specified volume when owner storage device of the pair volume transmits write request to the owner storage device of the specified volume. Triggered by the error, the owner storage device of pair volume accesses the quorum to lock ownership of the pair.

At 1109, the storage orchestrator requests the quorum device to delete the path between the quorum and the initiator of storage device managing the pair volume of the specified volume. This path deletion aims to prevent lock success by to the owner storage device of the pair volume. If the owner storage device of the pair volume fails to lock, it will abort the write and return error to requestor. At 1110, the quorum device deletes the specified path in response to the request.

At 1111, the storage orchestrator creates a new path between the specified volume and an initiator of the server on which container is to be launched. At 1112, the owner storage device of the specified volume creates the specified path.

FIG. 12 illustrates another example system, in accordance with an example implementation. In this example implementations, servers 1210 and 1211 belong to data centers DC1 and DC2, and each data center is connected via wide area network (WAN) through switch 1200. In this case, network latency between data centers are longer than the latency within the data center. If all servers belong to one cluster, the performance of container orchestrator 102 can degrade due to bad network latency. Therefore, a cluster can be created for each data centers. In this example implementation for a data center DC3, quorum device 130 may also utilize a restful server 1220. In this configuration, the flows and tables as described herein can be utilized in the same manner.

Through the example implementations described herein, it is possible to improve the availability and data protection in a container platform.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
    deleting an Input/Output (I/O) path between a container and a first volume when launching a new container accessing a second volume; and
    for failure of a storage orchestrator to delete the I/O path between the container and the first volume:
        deleting a path between the first volume and a quorum volume; and
        establishing an I/O path between the new container and the second volume.

2. The method of claim 1, wherein the first volume and second volume are paired volumes, and wherein the method further comprises deleting another path between the first volume and the second volume.

3. The method of claim 2, further comprising:
    for the first volume being designated as a primary volume, swapping the primary volume to the second volume.

4. The method of claim 2, further comprising suspending pair copy operations between the first volume and the second volume.

5. The method of claim 1, wherein storage orchestrator is provided across a plurality of storage devices, wherein a first storage device of the plurality of storage devices manages the first volume, and a second storage device from the plurality of storage devices manages the second volume.

6. A non-transitory computer readable medium, storing instructions for executing a process, the instructions comprising:
    deleting an Input/Output (I/O) path between a container and a first volume when launching a new container accessing a second volume; and
    for failure of a storage orchestrator to delete the I/O path between the container and the first volume:
        deleting a path between the first volume and a quorum volume; and
        establishing an Input/Output (I/O) path between the new container and the second volume.

7. The non-transitory computer readable medium of claim 6, wherein the first volume and second volume are paired volumes, and wherein the instructions further comprises deleting another path between the first volume and the second volume.

8. The non-transitory computer readable medium of claim 7, the instructions further comprising:
    for the first volume being designated as a primary volume, swapping the primary volume to the second volume.

9. The non-transitory computer readable medium of claim 7, the instructions further comprising suspending pair copy operations between the first volume and the second volume.

10. The non-transitory computer readable medium of claim 6, wherein storage orchestrator is provided across a plurality of storage devices, wherein a first storage device of the plurality of storage devices manages the first volume, and a second storage device from the plurality of storage devices manages the second volume.

11. A storage device in a system comprising a plurality of storage devices, the storage device comprising:
    a processor, configured to:
    delete an Input/Output (I/O) path between a container and a first volume when launching a new container accessing a second volume; and
    for failure of a storage orchestrator to delete the I/O path between the container and the first volume:
        delete a path between the first volume and a quorum volume; and
        establish an Input/Output (I/O) path between the new container and the second volume.

12. The storage device of claim 11, wherein the first volume and second volume are paired volumes, and wherein the processor is configured to delete another path between the first volume and the second volume.

13. The storage device of claim 12, wherein the processor is further configured to:
    for the first volume being designated as a primary volume, swap the primary volume to the second volume.

14. The storage device of claim 12, wherein the processor is configured to suspend pair copy operations between the first volume and the second volume.

15. The storage device of claim 11, wherein the storage orchestrator is provided across the plurality of storage devices, wherein the storage device of the plurality of storage devices manages the first volume, and another storage device from the plurality of storage devices manages the second volume.

* * * * *